(12) United States Patent
Oh

(10) Patent No.: US 7,069,463 B2
(45) Date of Patent: Jun. 27, 2006

(54) BUS CLOCK CONTROLLING APPARATUS AND METHOD

(75) Inventor: Jang Geun Oh, Suwon-si (KR)

(73) Assignee: LG Electronics Inc., Seoul (KR)

( * ) Notice: Subject to any disclaimer, the term of this patent is extended or adjusted under 35 U.S.C. 154(b) by 513 days.

(21) Appl. No.: 10/022,208

(22) Filed: Dec. 20, 2001

(65) Prior Publication Data

US 2002/0108070 A1 Aug. 8, 2002

(30) Foreign Application Priority Data

Dec. 21, 2000 (KR) .................................. 00-79509

(51) Int. Cl.
*G06F 1/04* (2006.01)

(52) U.S. Cl. ...................................... 713/503; 713/322
(58) Field of Classification Search ..................... None
See application file for complete search history.

(56) References Cited

U.S. PATENT DOCUMENTS

| 5,719,510 A * | 2/1998 | Weidner ...................... 327/119 |
| 6,079,022 A * | 6/2000 | Young ........................ 713/300 |
| 6,609,211 B1 * | 8/2003 | Atkinson .................... 713/323 |
| 6,694,442 B1 * | 2/2004 | Yeh ............................. 713/322 |
| 6,704,879 B1 * | 3/2004 | Parrish ....................... 713/322 |

* cited by examiner

*Primary Examiner*—Thuan Du
(74) *Attorney, Agent, or Firm*—Fleshner & Kim, LLP

(57) ABSTRACT

The present invention relates to an apparatus and method for throttling a clock of a bus used for data exchange between devices in a computer such as a portable computer or notebook. Methods according to the invention can set a throttle rate of a clock to a predetermined initial value, detect a current remaining battery capacity or a current load to the CPU, and adjust the set throttle rate to a prescribed or calculated value according to the detected remaining battery capacity or the CPU load. Thus, power consumption is reduced, and, in the case of a battery-powered computer, battery life and operating time are extended.

25 Claims, 5 Drawing Sheets

| Remaining Battery Capacity | System Performance | Throttle Rate of Bus Clock |
|---|---|---|
| 100 % | 100 % | 0 % |
| 75 % | 85 % | 15 % |
| 50 % | 75 % | 30 % |
| 25 % | 55 % | 45 % |
| 0 % | 40 % | 60 % |

BUS CLOCK CONTROLLING APPARATUS AND METHOD

BACKGROUND OF THE INVENTION

1. Field of the Invention

The present invention relates generally to computers, and more specifically to an apparatus and method for optimizing bus clock speed in a computer.

2. Background of the Related Art

In general, a computer such as a notebook computer can be supplied with its necessary electric energy by either an equipped battery or an AC power line. However, because battery capacity is limited, a notebook cannot be used for more than a few hours if its power is supplied from the equipped battery.

FIG. 1 is a simplified block diagram of a related art notebook. The notebook of FIG. 1 has a CPU 11 conducting ordinary well-known operations and functions; a bridge controller 12 conducting both assistant operations of the CPU 11 and management of memories, a video port, a bus, etc.; a video processor 13 for processing video data and outputting the processed data for video presentation; and a clock generator 10 providing 100 MHz clock 1 for the CPU 11 and the bridge controller 12, and a 66 MHz clock 2 for the video processor 13.

A PLL (Phase Lock Loop) circuit 110 is embedded in the CPU 11. The PLL circuit 110 multiplies the 100 MHz clock 1 from the clock generator 10 differently based on a current power supplying mode. For example, the PLL circuit 110 multiplies the 100 MHz clock by six times to produce a 600 MHz internal clock if an external AC power is supplying energy, and it multiplies the 100 MHz clock by five times to produce a 500 MHz clock if a battery is supplying electric energy.

Since power consumption of a CPU is proportional to the speed of a clock driving the CPU, if a 500 MHz internal clock is used in a battery supplying mode, processing speed is lowered and power dissipation is decreased in comparison to application of a 600 MHz internal clock. Therefore, battery life is extended in a battery supplying mode.

In addition, a clock throttling method is also used to reduce power consumption in a CPU. FIG. 2 shows a clock throttling method in which a clock source is periodically made inactive by a control signal 'STPCLK#'. Whenever the control signal 'STPCLK#', which is active LOW, is in active state, a CPU clock is deactivated, so that the CPU dissipates little power. As a result, average power consumption by the CPU is reduced. Therefore, power consumption reduction rate of a CPU can be regulated through adjustment of a duty cycle of the control signal 'STPCLK#'.

In related art portable computers configured and operated as above, the performance of a CPU is decreased during a battery supplying mode to reduce power consumption. However, the related art portable computers described above have various disadvantages. A host bus 3 to which both the CPU 11 and the bridge controller 12 are connected is driven by a bus clock, whose speed is fixed and whose state is always active, regardless of the power supplying mode. As a result, all devices connected to the host bus 3 are being driven at all times. Therefore, power saving in a battery supplying mode is less effective than if power was also managed for devices connected to the host bus 3.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an apparatus and method of throttling a clock of a host bus to reduce power consumption.

Another object of the present invention is to provide an apparatus and method of throttling a clock of a host bus connected to a CPU and a bridge controller in a portable computer.

Another object of the present invention is to provide an apparatus and method of throttling a clock of a host bus in a portable computer based on remaining battery capacity, CPU load or the like.

Another object of the present invention is to provide an apparatus and method of throttling a clock of a host bus, which both a CPU and a bridge controller in a computer are connected to, based on a remaining battery capacity or load to the CPU, in order to reduce power consumption.

In order to achieve at least the above objects in whole or in part, and in accordance with the purposes of the invention, as embodied and broadly described, there is provided a bus clock controlling method in a computer that includes setting a throttle rate of a clock to a predetermined initial value, the clock being used for a data bus connected between a CPU and a controlling device, detecting a remaining battery capacity if a present power source is at least one battery, and adjusting the set throttle rate according to the detected remaining battery capacity.

To further achieve at least the above objects in whole or in part, there is provided a bus clock controlling method in a computer that includes setting a throttle rate of a clock to a predetermined initial value, the clock being used for a data bus connected between a CPU and a controlling device, detecting a present load of the CPU, and adjusting the set throttle rate in reverse proportion to the present CPU load.

To further achieve at least the above objects in whole or in part, there is provided a computer that includes a CPU that processes, a first controller coupled to the CPU via a data bus, and configured to provide a throttled clock to the data bus according to a throttle rate, a clock generator coupled to the CPU and the first controller, and configured to generate a clock, a detector detecting a variable, wherein the variable is a remaining battery capacity or a load of the CPU, and a second controller coupled to receive the detected variable, configured to determine the throttle rate according to the detected variable, and further configured to output the throttle rate to the first controller.

To further achieve at least the above objects in whole or in part, there is provided a bus clock controlling method in a computer that includes setting a throttle rate of a clock to a predetermined initial value, the clock being used for a data bus to which both a CPU and a controlling device are connected, detecting a remaining battery capacity and a load of the CPU if a present power source is a battery, and adjusting the set throttle rate according to the detected remaining battery capacity and the CPU load.

To further achieve at least the above objects in whole or in part, there is provided a bus clock controlling method in a portable computer that includes setting a throttle rate of a clock to a predetermined initial value, the clock being used for a data bus connected between a controlling device and a selected one of a plurality of devices associated with the portable computer, detecting a condition of a prescribed criteria of the portable computer if a present power source is a battery, and adjusting the set throttle rate according to the detected condition, wherein the detected condition is within a range of values for the prescribed criteria.

To further achieve at least the above objects in whole or in part, there is provided a bus clock controlling method in a computer that includes setting a throttle rate of a clock to a predetermined initial value, the clock being used for a data bus to which both a controlling device and a peripheral device are connected, detecting one of a present load of the CPU and a remaining battery capacity, and adjusting the set throttle rate in reverse proportion to the detected one of the present CPU load and the remaining battery capacity.

To further achieve at least the above objects in whole or in part, there is provided a computer that includes means for setting a throttle rate of a data bus clock to a predetermined initial value, means for detecting at least one of a remaining battery capacity and a load of the CPU, and means for adjusting the throttle rate of the data bus clock based on at least one of the detected remaining battery capacity and the detected load of the CPU.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
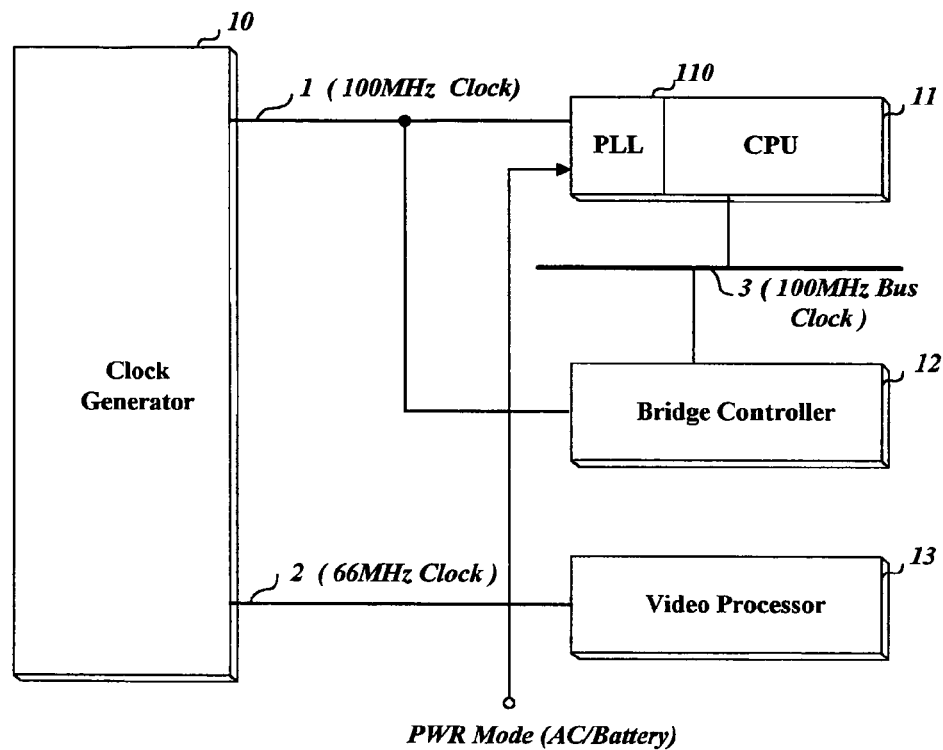
FIG. 1 is a simplified block diagram of a computer in the related art.
Figure 2:
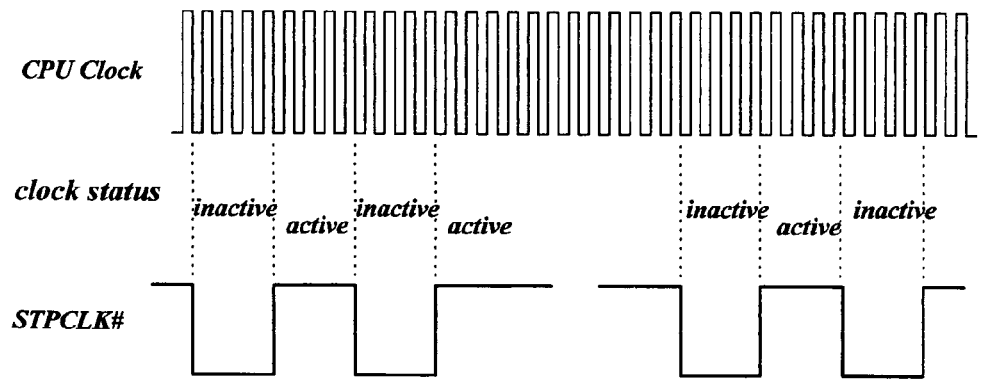
FIG. 2 is a CPU clock signal diagram as provided in the related art.
Figure 3:
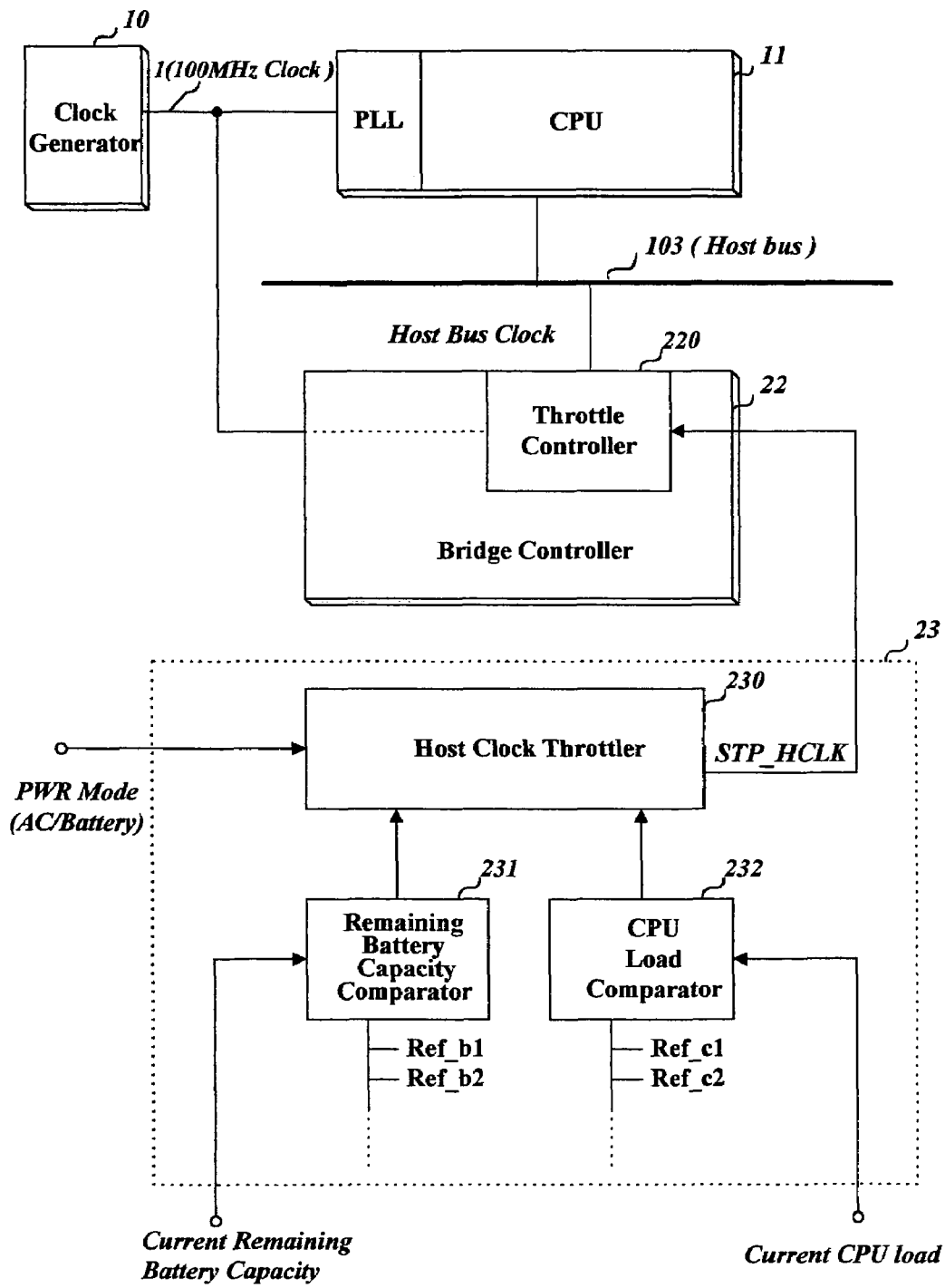
FIG. 3 is a block diagram that shows a computer including a bus clock controlling apparatus in accordance with a preferred embodiment of the invention.

FIG. 3 is a block diagram of a computer in which a preferred embodiment of a bus clock controlling apparatus in accordance with the present invention is embedded. The portable computer of FIG. 3 may include a CPU 11, a bridge controller 22, and a clock generator 10 as described above and shown in FIG. 1.

The clock generator 10 may provide the CPU 11 and the bridge controller 22 with a 100 MHz clock 1, and the bridge controller 22 may include a throttle controller 220 throttling a clock for a host bus 103 to which the CPU 11 is also connected or connected together. As used herein, throttling a clock refers to causing a decrease in clock duty cycle.

The computer with the preferred embodiment of a bus clock controlling apparatus of FIG. 3 may further have an embedded controller 23 including or consisting of a remaining battery capacity comparator 231 comparing a current remaining battery capacity with predetermined several references Ref_b1, Ref_b2, . . . , a CPU load comparator 232 and a host clock throttler 230. The CPU load comparator 232 compares a current load to the CPU 11 with several predetermined references Ref_c1, Ref_c2, . . . The host clock throttler 230 outputs a host clock control signal 'STP_H-CLK' whose duty cycle preferably varies according to the comparison result of the remaining battery capacity comparator 231 or the CPU load comparator 232.

Figure 4:
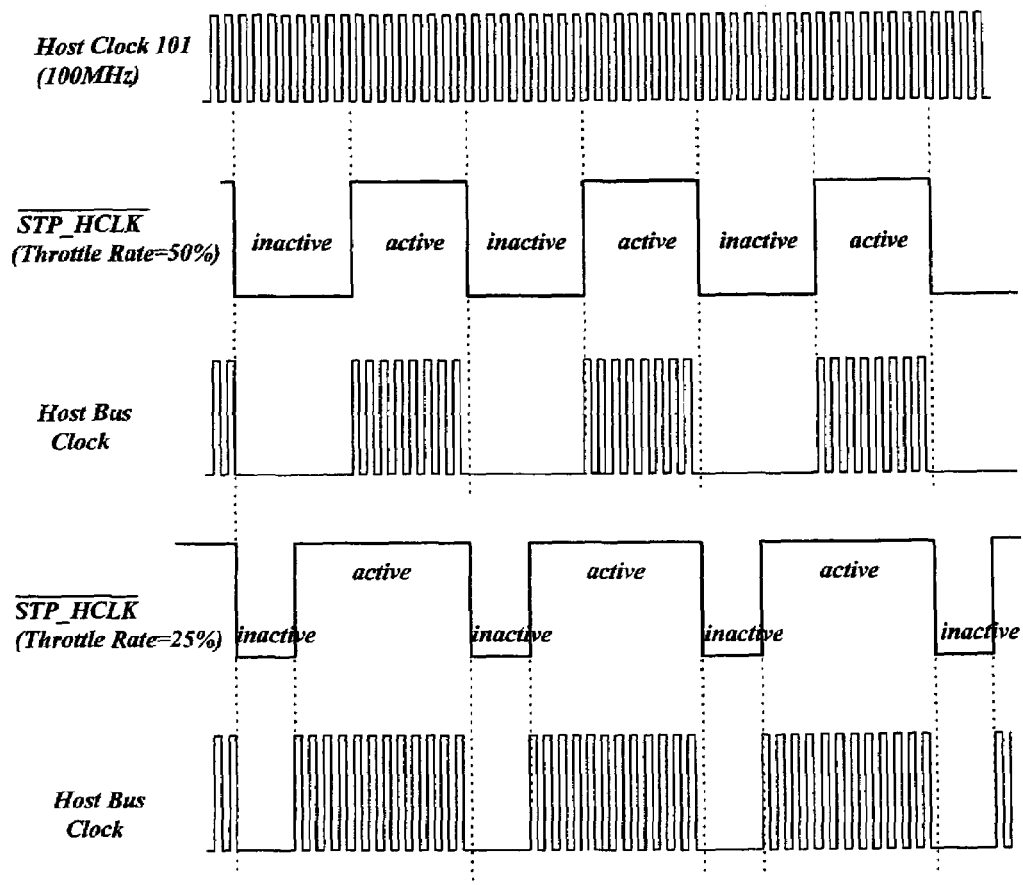
FIG. 4 is a diagram that shows a clock signal timing diagrams in accordance with a preferred embodiment of the invention.
Figure 5:
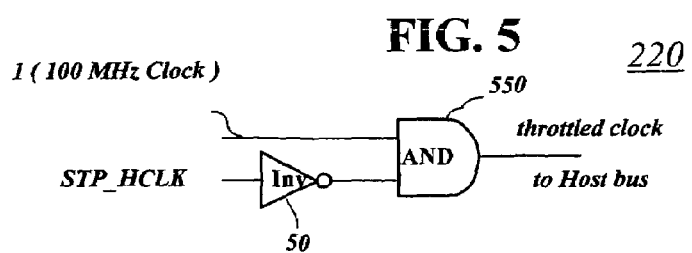
FIG. 5 is a logic diagram that shows a circuit embodying the throttle controller of FIG. 3 in accordance with a preferred embodiment of the invention.

The throttle controller 220 included in the bridge controller 22 may provide the 100 MHz clock 1 from the clock generator 10 to the host bus 103 only while the host clock control signal 'STP_HCLK' from the host clock throttler 230 is inactive or low, as shown in FIGS. 4 and 5. The examples depicted in FIG. 4 are for throttle rates of 50% and 25%, respectively. As used herein, a 25% throttle rate results in a 75% duty cycle for the host bus clock.

The throttle controller 220 can be implemented with an inverter 50 and an AND gate 55 as shown in FIG. 5. However, the present invention is not intended to be so limited. In the logic circuit of FIG. 5, if the host clock control signal 'STP_HCLK' makes a transition to LOW, an input "$\overline{STP\_HCLK}$" to one terminal of the AND gate 55 becomes HIGH. The 100 MHz clock 1 is applied to the other input terminal of the AND gate 55. Thus, when "STP_H-CLK" is LOW the 100 MHz clock 1 is output from the AND gate 55 and delivered to the host bus 103, to which the CPU 11 and the bridge controller 22 are connected.

A remaining battery capacity detecting circuit (not shown in the figures), a CPU load detecting circuit (not shown in the figures), and a mode detecting circuit (also not shown in the figures) that detects whether an electric energy is supplied from an equipped battery or an AC power source can all be implemented by well-known technology. Therefore, a detailed description of these features is omitted here.

Figure 6:
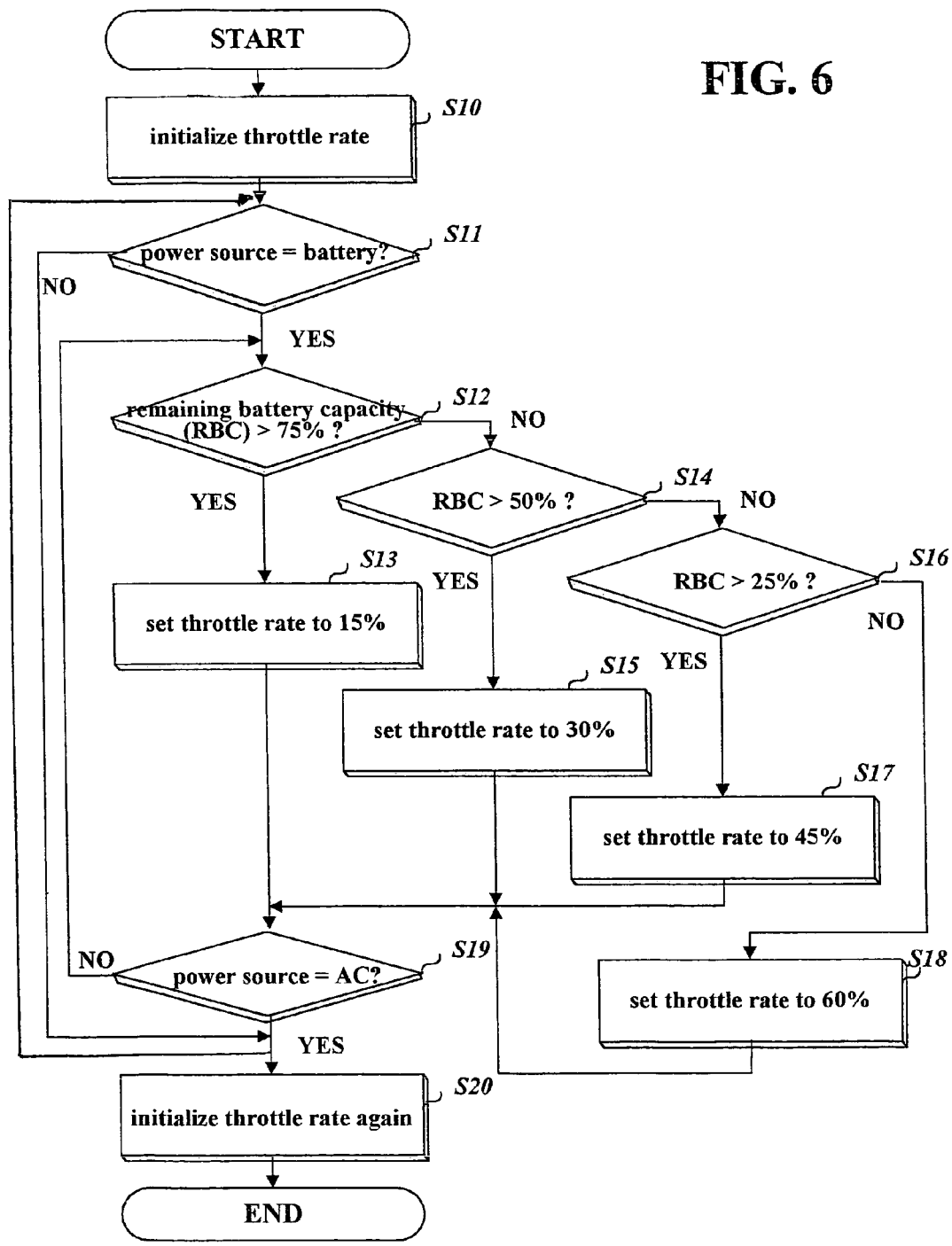
FIG. 6 is a diagram that shows a flow chart embodying a bus clock controlling method of a computer in accordance with a preferred embodiment of the invention.

FIG. 6 is a flow chart embodying a first preferred embodiment of a method for throttling a host bus clock in accordance with the present invention. As shown in FIG. 6, the first preferred embodiment of a method for throttling a host bus clock is based on a remaining battery capacity of a computer. However, the present invention is not intended to be so limited. The throttle controller 220 included in the bridge controller 22 may set a throttle rate for the host bus clock to an initial value of zero (0%) upon computer boot-up in step S10. At this throttle rate, the computer performs fully.

Next, in step S11, it is determined whether electric energy is supplied from an equipped battery or an external AC power source preferably using the embedded controller 23 or the like. If the power source is AC power, control jumps to step S20. If the battery is supplying the electric energy, a current Remaining Battery Capacity (RBC) may be compared with the several references Ref_b1, Ref_b2, . . . at the RBC comparator 231 in steps S12, S14, and S16. When the corresponding comparison is complete, the host clock throttler 230 may set the throttle rate to a new value in step S13, step S15, step S17 or step S18 according to the comparison result in steps S12, S14 and S16. The throttle rate may be set in reverse proportion to the RBC. As a result, the battery life and its operating time is extended when the RBC is small, even though the performance of the portable computer may be lowered.

For example, if it is determined in step S12 that the RBC is above 75%, then the throttle rate may be set to 15% in step S13. If it is determined in step S14 that the RBC is in range of 75% to 51%, the throttle rate may be set to 30% instep S15. If it is determined in step S16 that the RBC is in the range of 50% to 26%, then the throttle may be set to 45% in step S17. If it determined in step 16 that the RBC is 24% or lower, then the throttle rate may be set to 60% in step S18.

From steps S13, S15, S17 and S18, control continues to step S19 where it is determined if a power source is AC power. If AC power is detected in step S19, then the throttle rate may be initialized in step S20. Otherwise, control returns from step S19 to step S12.

Figures 7, 8:
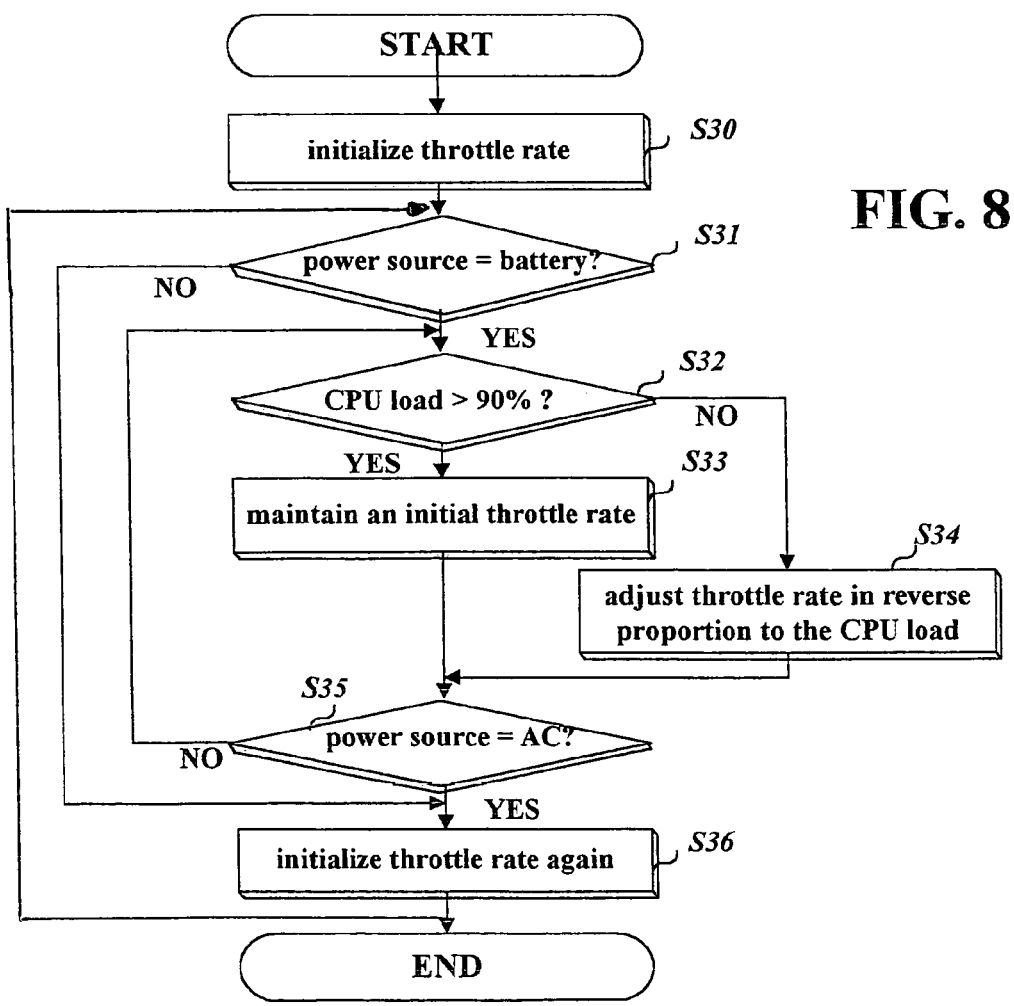
FIG. 7 is a diagram that shows a table of throttle rates and system performance for each range of remaining battery capacity according to a preferred embodiment of the invention.
FIG. 8 is a diagram that shows a flow chart embodying another bus clock controlling method of a computer in accordance with a preferred embodiment of the invention.

FIG. 7 tabulates exemplary respective throttle rate and system performance for each range of remaining battery capacity. As shown in FIG. 7, the system performance may be lowered as the throttle rate is raised, namely, if the throttle rate is raised by T %, the system performance may be lowered by (100-T)%.

During the time when the host clock is not provided, all devices that operate in synchronization with the host clock cannot conduct data exchange operations. Therefore, such devices do not dissipate the supplied power. Of course, system performance may be lowered.

FIG. 8 is a flow chart embodying a second preferred embodiment of a method of throttling a host bus clock in accordance with the present invention. As shown in FIG. 8, the second preferred embodiment of a method of throttling a host bus clock is based on a load to a CPU of a computer. In the preferred embodiment of FIG. 8, the throttle rate for the host bus clock 1 may be set to an initial value, e.g., zero, at system booting in step S30. In this instance, all pulses of the 100 MHz clock 1 from the clock generator 10 are used as the host bus clock and the computer operates at full performance.

Next, it is determined in step S31 whether an electric energy is fed from an equipped battery or an external AC power source preferably using the embedded controller 23 or the like. If the battery is supplying the electric energy, a current CPU load may be compared in step S32 with a plurality of load references such as the load references Ref_cl, Ref_c2, . . . at the CPU load comparator 232.

For example, if the comparison by the CPU load comparator 232 indicates that the current CPU load is above 90%, the host clock throttler 230 may maintain the initial throttle rate of 0% in step S33, and if the CPU load is below 90%, host clock throttle 230 may adjust the throttle rate in reverse proportion to the CPU load in step S34 in order to extend the battery life and its operating time, although the performance of the portable computer may be lowered. From steps S33 and S34, control continues to step S35.

Alternatively, step S32 may be expanded into a series of CPU load comparisons that may result in a range of adjustments to host clock throttle in step S34. For example, if the current CPU load is determined to be in the range of 90% to 75% of full load in step S32, the throttle rate may be set to 15% in step S34 by adjusting duty ratio of the host clock control signal to 15%. As a result, 85% of the pulses of the 100 MHz clock 1 from the clock generator 10 are provided for the host bus by the throttle controller 220. Likewise, if the current CPU load is in range of 75% to 50%, the throttle rate may be set to 30%; if CPU load is in the range of 50% to 25%, the throttle rate may be set to 45%; and if the CPU load is below 25%, the throttle rate may be set to 60%.

From steps S33 and S34, control continues to step S35. If it is determined in step S35 that a power source is switched from a battery to an AC source after the throttle rate is adjusted as described, the throttle rate may be reset to 0% in step S36, as in step S30, in order to fully operate or maximize system performance.

The second preferred embodiment of a method of throttling a host bus clock depicted in FIG. 8 is also applicable to an AC power supplying mode as well as battery supplying mode. It may be advantageous, for example, to conserve power even when the computer is not powered with a battery source.

In the preferred embodiments according to the present invention, the host clock throttler 230 or the like may calculate the throttle rate based on the following equation (1) instead of selecting a condition-matching value among several predetermined throttle rates as described with reference to FIGS. 6–8 above.

$$TR \text{ (Throttle Rate)} = MR - (MR \times X/Xmax) \ldots \text{Eq.} \quad (1)$$

where X is a variable of battery remaining capacity or CPU load, Xmax is maximum value of variable X, and MR is maximum or prescribed throttle rate.

For example, if a battery is at 30% capacity and the maximum throttle rate is 60, then X may be 3, Xmax may be 10, and the throttle rate $TR=60-(60\times3/10)=60-18=42\%$. In another preferred embodiment, X and Xmax may refer to CPU loads. However, the present invention is not intended to be so limited. The above-described throttle rate adjusting operations are preferably executed through a timer interrupt service routine that wakes up periodically, for example, every 100 ms.

The preferred embodiments are applied to the host bus to which a CPU and a bridge controller are connected. However, throttle rate adjusting operations and apparatus according to preferred embodiments of the present invention are also applicable to a PCI bus to which a bridge controller and one or more peripheral devices are connected.

As described above, preferred embodiments of bus clock controlling apparatus and methods have various advantages. Preferred embodiments of host bus clock controlling apparatus and methods can adjust performance of devices connected to a data bus according to a remaining battery capacity or a CPU load by throttling a clock of the data bus. Thus, power consumption in a battery-powered computer system may be reduced, and battery life and operating time may be extended. Throttling based on CPU load may also conserve power in a AC-supplied computer.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A bus clock controlling method in a computer, comprising:

setting a throttle rate of a clock to a predetermined initial value, the clock configured to set a speed of a data bus connected between a CPU and a controlling device;
detecting a remaining battery capacity if a present power source is at least one battery; and
adjusting the set throttle rate by the controlling device according to the detected remaining battery capacity, wherein the set throttle rate is adjusted when the controlling device is providing the clock to the data bus between the CPU and the controlling device.

2. The method set forth in claim 1, wherein said adjusting step increases the set throttle rate as the detected remaining battery capacity decreases.

3. The method set forth in claim 1, wherein said adjusting step selects one value appropriate to the detected remaining battery capacity among a plurality of throttle rates preset in reverse proportion to different remaining battery capacities.

4. The method set forth in claim 1, wherein said controlling device is a bridge controller in a computer, wherein a second clock is provided to the controlling device and the CPU, and wherein the throttle rate of the clock is set independently of the second clock, and wherein the clock has a different value than the second clock.

5. The method of claim 1, comprising:
generating the clock for the CPU and the controlling device; and
determining the throttle rate using a second controlling device according to the remaining battery capacity and outputting the throttle rate to the controlling device, wherein said second controlling device outputs the throttle rate in the form of a pulse signal whose duty cycle varies in accordance with the detected remaining battery capacity, and wherein the controlling device includes a throttle controller providing the data bus with the throttled clock only when the pulse signal is in a specific state.

6. A bus clock controlling method in a computer, comprising:
setting a throttle rate of a clock to a predetermined initial value, the clock configured to set a speed of a data bus connected between a CPU and a controlling device;
detecting a present load of the CPU; and
adjusting the set throttle rate in reverse relation to the present CPU load by the controlling device, wherein the set throttle rate is adjusted when the controlling device is providing the clock to the data bus between the CPU and the controlling device.

7. The method set forth in claim 6, wherein said adjusting step is conducted only when a present power source is at least one battery, wherein a second clock is provided to the controlling device and the CPU, and wherein the throttle rate of the clock is set independently of the second clock, and wherein the clock has a different value than the second clock.

8. The method set forth in claim 6, wherein said adjusting step includes selecting a new throttle rate appropriate to the detected CPU load from a plurality of throttle rates preset in reverse proportion to different CPU loads.

9. The method of claim 6, comprising:
generating the clock for the CPU and the controlling device; and
determining the throttle rate using a second controller according to the remaining battery capacity and outputting the throttle rate to the controlling device, wherein said second controller outputs the throttle rate in the form of a pulse signal whose duty cycle varies in accordance with the present load of the CPU, and wherein the controlling device includes a throttle controller providing the data bus with the throttled clock only when the pulse signal is in a specific state.

10. A computer, comprising:
a CPU that processes;
a first controller coupled to the CPU via a data bus, and configured to provide a throttled clock to the data bus according to a throttle rate;
a clock generator coupled to the CPU and the first controller, and configured to generate a clock for the CPU and the first controller;
a detector detecting a variable, wherein the variable is a remaining battery capacity or a load of the CPU; and
a second controller coupled to receive the detected variable, configured to determine the throttle rate according to the detected variable, and further configured to output the throttle rate to the first controller, wherein the throttled clock is configured to selectively have a different independent value than the clock supplied to the first controller and the clock supplied to the second controller.

11. The computer of claim 10, wherein said second controller outputs the throttle rate in the form of a pulse signal whose duty cycle varies in accordance with the detected variable, and wherein the first controller includes a throttle controller providing the data bus with the throttled clock only when the pulse signal is in a specific state.

12. The computer of claim 10, wherein said first controller is a bridge controller, and wherein said second controller determines the throttle rate in reverse proportion to the detected variable, wherein the bridge controller directly sets the throttled clock speed of the data bus.

13. The computer of claim 10, wherein the throttle rate increases as a value of the detected variable decreases.

14. The computer of claim 10, wherein the second controller comprises:
at least one comparator coupled to receive the detected variable from the detector, configured to compare the detected variable to a plurality of predetermined values, and further configured to output a result of the corresponding plurality of comparisons; and
a host clock throttler coupled to receive the plurality of comparisons and a power mode signal, and configured to output the throttle rate to the first controller.

15. The computer of claim 14, wherein the at least one comparator comprises a remaining battery capacity comparator, and wherein the detected variable is the remaining battery capacity.

16. The computer of claim 14, wherein the at least one comparator comprises a CPU load comparator, and wherein the detected variable is the load of the CPU.

17. The computer of claim 14, wherein the at least one comparator comprises a remaining battery capacity comparator and a CPU load comparator.

18. A bus clock controlling method in a computer, comprising:
setting a throttle rate of a clock to a predetermined initial value, the clock being used for a data bus to which both a CPU and a controlling device are connected;
detecting a remaining battery capacity or a load of the CPU if a present power source is a battery; and
adjusting the set throttle rate according to the detected remaining battery capacity and the CPU load, wherein a second clock is provided to the controlling device and the CPU, and wherein the throttle rate of the clock is set independently of the second clock, and wherein the clock has a different value than the second clock.

19. The method of claim 18, wherein a third clock is provided to the CPU, wherein the clock as a different value than the third clock.

20. A bus clock controlling method in a portable computer, comprising:
    setting a throttle rate of a clock to a predetermined initial value, the clock being used for a data bus connected between a controlling device and a selected one of a plurality of devices associated with the portable computer;
    detecting a condition of a remaining battery or a CPU load of the portable computer if a present power source is a battery; and
    adjusting the set throttle rate using the controlling device according to the detected condition, wherein the detected condition is within a range of values for the prescribed criteria, wherein a first clock is provided to the controlling device and a second clock is provided the CPU, and wherein the throttle rate of the clock is set independently of the first clock and the second clock, and wherein the clock has a different value than the first clock and the second clock.

21. The bus clock controlling method of claim 20, wherein the selected device is a peripheral device, and wherein the predetermined initial value is a smallest throttle rate, wherein the controlling device directly sets the clock during normal operations.

22. The bus clock controlling method of claim 20, wherein said adjusting step selects a rate corresponding to the detected condition among a plurality of prescribed throttle rates that each correspond to mutually exclusive sets of values of the detected condition within the range of values for the prescribed criteria.

23. The bus clock controlling method of claim 22, wherein each of the plurality of prescribed throttle rates increases as the detected condition decreases within the range.

24. A bus clock controlling method in a computer, comprising
    setting a throttle rate of a clock to a predetermined initial value, the clock configured to set a speed of a data bus to which both a controlling device and a peripheral device are connected;
    detecting one member chosen from a present load of the CPU and a remaining battery capacity; and
    adjusting the set throttle rate by the controlling device in reverse relation to the detected one of the present CPU load and the remaining battery capacity, wherein the set throttle rate is adjusted when the controlling device is providing the clock to the data bus between the controlling device and the peripheral device.

25. The method of claim 24, comprising:
    generating the clock for the CPU and the controlling device; and
    determining the throttle rate using a second controller according to the remaining battery capacity and outputting the throttle rate to the controlling device, wherein said second controller outputs the throttle rate in the form of a pulse signal whose duty cycle varies in accordance with the detected one of the present CPU load and the remaining battery capacity, and wherein the controlling device includes a throttle controller providing the data bus with the throttled clock only when the pulse signal is in a specific state.

* * * * *